United States Patent
Hu et al.

(10) Patent No.: US 10,547,985 B2
(45) Date of Patent: Jan. 28, 2020

(54) TERMINAL DEVICE, NETWORK DEVICE, AND GROUP COMMUNICATION METHOD

(71) Applicant: Huawei Technologies Co., Ltd., Shenzhen (CN)

(72) Inventors: Zhenxing Hu, Shenzhen (CN); Bingzhao Li, Beijing (CN); Yongqiang Gao, Beijing (CN); Jian Zhang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/296,819

(22) Filed: Mar. 8, 2019

(65) Prior Publication Data

US 2019/0239034 A1    Aug. 1, 2019

Related U.S. Application Data

(63) Continuation of application No. 15/663,162, filed on Jul. 28, 2017, now Pat. No. 10,271,181, which is a continuation of application No. PCT/CN2015/071763, filed on Jan. 28, 2015.

(51) Int. Cl.
*H04W 4/08* (2009.01)
*H04W 88/02* (2009.01)
*H04W 4/06* (2009.01)

(52) U.S. Cl.
CPC .............. *H04W 4/08* (2013.01); *H04W 4/06* (2013.01); *H04W 88/023* (2013.01)

(58) Field of Classification Search
CPC ........ H04W 4/06; H04W 4/08; H04W 88/023
See application file for complete search history.

(56) References Cited

U.S. PATENT DOCUMENTS

| | | | |
|---|---|---|---|
| 9,351,022 | B2 | 5/2016 | Fan |
| 2009/0209271 | A1 | 8/2009 | Reed et al. |
| 2010/0118810 | A1 | 5/2010 | Qu et al. |
| 2011/0038299 | A1 | 2/2011 | Sugawara et al. |
| 2011/0261747 | A1 | 10/2011 | Wang et al. |
| 2012/0236776 | A1 | 9/2012 | Zhang et al. |
| 2012/0300655 | A1 | 11/2012 | Lee et al. |
| 2012/0302240 | A1 | 11/2012 | Tamaki et al. |
| 2013/0039248 | A1 | 2/2013 | Koskinen et al. |
| 2013/0242730 | A1 | 9/2013 | Pelletier et al. |
| 2013/0242848 | A1 | 9/2013 | Kim et al. |
| 2013/0301492 | A1 | 11/2013 | Ji et al. |

(Continued)

FOREIGN PATENT DOCUMENTS

| | | |
|---|---|---|
| CN | 101568071 A | 10/2009 |
| CN | 103238359 A | 8/2013 |

(Continued)

OTHER PUBLICATIONS

Machine Translation and Abstract of Chinese Publication No. CN103491643, Jan. 1, 2014, 28 pages.

(Continued)

*Primary Examiner* — Dominic E Rego
(74) *Attorney, Agent, or Firm* — Conley Rose, P.C.

(57) ABSTRACT

A terminal device, a network device, and a group communication method, where the terminal device includes a receiver configured to receive a first message from a network device, where the first message includes at least one group service identifier, and one group service identifier corresponds to one group service, and receive, according to the received first message, a first group service corresponding to a first group service identifier of the terminal device.

20 Claims, 8 Drawing Sheets

(56) References Cited

U.S. PATENT DOCUMENTS

| | | |
|---|---|---|
| 2014/0010141 A1 | 1/2014 | Kim et al. |
| 2014/0036669 A1 | 2/2014 | Yang et al. |
| 2014/0036861 A1 | 2/2014 | Tsai et al. |
| 2014/0092801 A1 | 4/2014 | Kim et al. |
| 2014/0177506 A1 | 6/2014 | Korus et al. |
| 2014/0200014 A1 | 7/2014 | Iwai |
| 2014/0286222 A1 | 9/2014 | Yu et al. |
| 2015/0172876 A1 | 6/2015 | Mustajarvi |
| 2015/0208382 A1 | 7/2015 | Yao et al. |
| 2016/0135143 A1 | 5/2016 | Won et al. |

FOREIGN PATENT DOCUMENTS

| | | |
|---|---|---|
| CN | 103491643 A | 1/2014 |
| CN | 103493400 A | 1/2014 |
| JP | 2014502075 A | 1/2014 |
| JP | 2014525691 A | 9/2014 |
| WO | 2014161491 A1 | 10/2014 |

OTHER PUBLICATIONS

Ericsson, "Notification mechanisms for SIB13," R2-096742, 3GPP TSG-RAN WG2 #68, Nov. 9-13, 2009, 3 pages.

Foreign Communication From a Counterpart Application, PCT Application No. PCT/CN2015/071763, English Translation of International Search Report dated Sep. 25, 2015, 2 pages.

Foreign Communication From a Counterpart Application, PCT Application No. PCT/CN2015/071763, English Translation of Written Opinion dated Sep. 25, 2015, 5 pages.

Foreign Communication From a Counterpart Application, European Application No. 15879359.6, Extended European Search Report dated Oct. 12, 2017, 8 pages.

Foreign Communication From a Counterpart Application, Japanese Application No. 2017-539630, Japanese Office Action dated Aug. 29, 2018, 5 pages.

Foreign Communication From a Counterpart Application, Japanese Application No. 2017-539630, English Translation of Japanese Office Action dated Aug. 29, 2018, 7 pages.

Machine Translation and Abstract of Chinese Publication No. CN101568071, Oct. 28, 2009, 18 pages.

Foreign Communication From a Counterpart Application, Chinese Application No. 201580068024.3, Chinese Office Action dated Apr. 16, 2019, 8 pages.

Foreign Communication From a Counterpart Application, Chinese Application No. 201580068024.3, Chinese Search Report dated Apr. 8, 2019, 3 pages.

TERMINAL DEVICE, NETWORK DEVICE, AND GROUP COMMUNICATION METHOD

CROSS-REFERENCE TO RELATED APPLICATION

This application is a continuation of U.S. patent application Ser. No. 15/663,162, filed on Jul. 28, 2017, which is a continuation of International Application No. PCT/CN2015/071763 filed on Jan. 28, 2015. All of the aforementioned patent applications are hereby incorporated by reference in their entireties.

TECHNICAL FIELD

Embodiments of the present disclosure relate to the field of mobile communications, and in particular, to a terminal device, a network device, and a group communication method.

BACKGROUND

Group communication refers to a mechanism for mutual communication between a group of user equipments (UEs). During group communication, only one UE in a group of UEs is allowed to speak, and the other UEs receive voice content of the speaking UE over a downlink. Currently, group communication is usually implemented using a group communications server. Each UE in a group of UEs establishes a signalling connection and a voice connection to a group server in order to implement group communication. The group communications server authorizes, using signalling, a UE to speak, and transmits downlink voices of the speaking UE to the other UEs in the group. When a UE needs to speak, the UE requests the group communications server for the floor using Session Initiation Protocol (SIP) signalling. Only after the group communications server gives the floor to the UE, the speaking UE can send voices to the other UEs in the group. Similarly, the group communications server instructs, using SIP signalling, the other UEs in the group to start to listen to the talk.

Among current implementation manners of group communication, the simplest implementation manner is to implement group communication using a same processing manner as that for normal voice communication. That is, each UE on an access network side requires a separate downlink voice channel for transmitting a voice message. Such a processing manner requires each UE to separately send a same voice message. Consequently, radio resources are wasted.

SUMMARY

Embodiments of the present disclosure provide a terminal device, a network device, and a group communication method to implement group communication.

According to a first aspect, a terminal device is provided, including a first receiving module, the first receiving module being configured to receive a first message sent by a network device, where the first message includes at least one group service identifier, and one group service identifier corresponds to one group service, and a second receiving module, the second receiving module being configured to receive, according to the first message received by the first receiving module, a first group service corresponding to a first group service identifier of the terminal device.

With reference to the first aspect, in a first possible implementation manner of the first aspect, the terminal device includes a third receiving module, the third receiving module being configured to receive configuration information of the first message such that the first receiving module of the terminal device receives the first message according to the configuration information of the first message, where the configuration information of the first message received by the third receiving module includes at least one of a time pattern that is used by the network device to send the first message, a first Radio Network Temporary Identifier (RNTI), and a modulation and coding scheme of the first message.

With reference to the first possible implementation manner of the first aspect, in a second possible implementation manner of the first aspect, the time pattern that is used by the network device to send the first message and that is received by the third receiving module includes at least one of a change period of the first message, a repetition coefficient for sending the first message, and a time offset of the first message.

With reference to the first or the second possible implementation manner of the first aspect, in a third possible implementation manner of the first aspect, the first receiving module includes a first receiving unit, where when the configuration information received by the third receiving module includes the first RNTI, the first receiving unit is configured to receive first downlink control information according to the first RNTI in order to receive the first message according to the first downlink control information, or when the configuration information received by the third receiving module does not include the first RNTI, the first receiving unit is configured to receive the first downlink control information according to the first default RNTI in order to receive the first message according to the first downlink control information.

With reference to any one of the first aspect or the first to the third possible implementation manners of the first aspect, in a fourth possible implementation manner of the first aspect, when the at least one group service identifier includes the first group service identifier of the terminal device, the second receiving module is configured to receive the first group service according to the first message received by the first receiving module.

With reference to any one of the first aspect or the first to the fourth possible implementation manners of the first aspect, in a fifth possible implementation manner of the first aspect, the first message received by the first receiving module further includes at least one of a period for sending the first message by the network device, a change period of the first message, a time offset of each group service corresponding to the at least one group service identifier, a second RNTI, and a logical channel number of each group service.

With reference to any one of the first aspect or the first to the fifth possible implementation manners of the first aspect, in a sixth possible implementation manner of the first aspect, the second receiving module includes a second receiving unit, where when the first message includes the second RNTI, the second receiving unit is configured to receive second downlink control information according to the second RNTI in order to receive the first group service according to the second downlink control information, or when the first message does not include the second RNTI, the second receiving unit is configured to receive the second downlink control information according to a second default RNTI in order to receive the first group service according to the second downlink control information.

With reference to the sixth possible implementation manner of the first aspect, in a seventh possible implementation manner of the first aspect, the second receiving module further includes a third receiving unit, the third receiving unit being configured to receive a Media Access Control (MAC) packet data unit (PDU) according to the second downlink control information received by the second receiving unit, and receive, according to a logical channel number of the first group service received by the first receiving module, a MAC service data unit (SDU) of the first group service received by the second receiving module when the first message received by the first receiving module includes the logical channel number of each group service, or receive, according to the first group service identifier, a MAC SDU of the first group service received by the second receiving module when the first message received by the first receiving module does not include the logical channel number of each group service.

With reference to the seventh possible implementation manner of the first aspect, in an eighth possible implementation manner of the first aspect, the MAC PDU received by the second receiving module carries a MAC control element (CE) to indicate that the first group service ends.

With reference to any one of the first aspect or the first to the seventh possible implementation manners of the third aspect, in a ninth possible implementation manner of the first aspect, the terminal device further includes a determining module, the determining module being configured to determine, according to change indication information, that the first message received by the first receiving module is changed, where the change indication information includes indication information that indicates that the first message is changed and that is carried in a paging message, indication information that indicates that the first message is changed and that is carried in an System Information Block 1 (SIB1) message, or indication information that indicates that the first message is changed and that is carried in the first downlink control information, when the second receiving module receives the first downlink control information.

With reference to any one of the first aspect or the first to the ninth possible implementation manners of the first aspect, in a tenth possible implementation manner of the first aspect, the first receiving module is further configured to receive the first message at a moment at which the network device sends the multicast control information if the terminal device does not store the first message, and receive a changed first message at a moment at which the network device sends the changed first message in order to receive a changed first group service according to the changed first message if the terminal device already stores the multicast control information and determines that the first message is changed.

According to a second aspect, a network device is provided, including a first sending module, the first sending module being configured to send a first message to a terminal device, where the first message includes at least one group service identifier, and one group service identifier corresponds to one group service, and a second sending module, the second sending module being configured to send a group service corresponding to the at least one group service identifier to the terminal device.

With reference to the second aspect, in a first possible implementation manner of the second aspect, the network device further includes a third sending module, the third sending module being configured to send configuration information of the first message such that the terminal device receives the first message according to the configuration information of the first message, where the configuration information of the first message includes at least one of a time pattern for sending the first message, a first RNTI, and a modulation and coding scheme of the first message.

With reference to the first possible implementation manner of the second aspect, in a second possible implementation manner of the second aspect, the time pattern for sending the first message by the third sending module includes at least one of a change period of the first message, a repetition coefficient for sending the first message, and a time offset of the first message.

With reference to any one of the second aspect or the first or the second possible implementation manner of the second aspect, in a third possible implementation manner of the second aspect, the first message sent by the first sending module further includes at least one of a period for sending the first message, a change period of the first message, a time offset of each group service in the at least one group service, a second RNTI, and a logical channel number of each group service.

With reference to any one of the second aspect or the first or the second possible implementation manner of the second aspect, in a third possible implementation manner of the second aspect, the first sending module is further configured to send indication information indicating that the first message is changed to the terminal device, including sending a paging message carrying the indication information to the terminal device, sending an SIB1 message carrying the indication information to the terminal device, or sending first downlink control information carrying the indication information to the terminal device.

According to a third aspect, a group communication method is provided, including receiving, by a terminal device, a first message sent by a network device, where the first message includes at least one group service identifier, and one group service identifier corresponds to one group service, and receiving, by the terminal device according to the first message, a first group service corresponding to a first group service identifier of the terminal device.

With reference to the third aspect, in a first possible implementation manner of the third aspect, the method includes receiving, by the terminal device, configuration information of the first message in order to receive the first message according to the configuration information of the first message, where the configuration information of the first message includes at least one of a time pattern that is used by the network device to send the first message, a first RNTI, and a modulation and coding scheme of the first message.

With reference to the first possible implementation manner of the third aspect, in a second possible implementation manner of the third aspect, the time pattern that is used by the network device to send the first message includes at least one of a change period of the first message, a repetition coefficient for sending the first message, and a time offset of the first message.

With reference to the first or the second possible implementation manner of the third aspect, in a third possible implementation manner of the third aspect, receiving, by the terminal device, configuration information of the first message in order to receive the first message according to the configuration information of the first message includes receiving, by the terminal device, first downlink control information according to the first RNTI in order to receive the first message according to the first downlink control information when the configuration information includes the first RNTI, or receiving, by the terminal device, the first downlink control information according to a first default RNTI in order to receive the first message according to the downlink control information when the configuration information does not include the first RNTI.

With reference to any one of the third aspect or the first to the third possible implementation manners of the first aspect, in a fourth possible implementation manner of the third aspect, when the at least one group service identifier includes the first group service identifier of the terminal device, the terminal device receives the first group service according to the first message.

With reference to any one of the third aspect or the first to the fourth possible implementation manners of the third aspect, in a fifth possible implementation manner of the third aspect, the first message further includes at least one of a period for sending the first message by the network device, a change period of the first message, a time offset of each group service in the at least one group service, a second RNTI, and a logical channel number of each group service.

With reference to any one of the third aspect or the first to the fifth possible implementation manners of the third aspect, in a sixth possible implementation manner of the third aspect, receiving, by the terminal device according to the first message, a first group service corresponding to a first group service identifier of the terminal device includes receiving, by the terminal device, second downlink control information according to the second RNTI in order to receive the first group service according to the second downlink control information when the first message includes the second RNTI, or receiving, by the terminal device, the second downlink control information according to a second default RNTI in order to receive the first group service according to the second downlink control information when the first message does not include the second RNTI.

With reference to the sixth possible implementation manner of the third aspect, in a seventh possible implementation manner of the third aspect, the receiving, by the terminal device according to the first message, a first group service corresponding to a first group service identifier of the terminal device includes receiving, by the terminal device, a MAC PDU according to the second downlink control information, and receiving, by the terminal device, a MAC SDU of the first group service according to a logical channel number of the first group service in the logical channel number of each group service when the first message includes the logical channel number of each group service, or receiving, by the terminal device, a MAC SDU of the first group service according to the first group service identifier when the first message does not include the logical channel number of each group service.

With reference to the seventh possible implementation manner of the third aspect, in an eighth possible implementation manner of the third aspect, the MAC PDU carries a MAC CE, to indicate that the first group service ends.

With reference to any one of the third aspect or the first to the eighth possible implementation manners of the third aspect, in a ninth possible implementation manner of the third aspect, the method further includes determining, by the terminal device according to change indication information, that the first message is changed, where the change indication information includes indication information that indicates that the first message is changed and that is carried in a paging message, indication information that indicates that the first message is changed and that is carried in an SIB1 message, or indication information that indicates that the first message is changed and that is carried in the first downlink control information, when the terminal device receives the first downlink control information.

With reference to any one of the third aspect or the first to the ninth possible implementation manners of the third aspect, in a tenth possible implementation manner of the third aspect, receiving, by a terminal device, a first message sent by a network device includes receiving the first message at a moment at which the network device sends the multicast control information if the terminal device does not store the first message, and receiving a changed first message at a moment at which the network device sends the changed first message in order to receive a changed first group service according to the changed first message if the terminal device already stores the multicast control information and determines that the first message is changed.

According to a fourth aspect, a group communication method is provided, including sending a first message to a terminal device, where the first message includes at least one group service identifier, and one group service identifier corresponds to one group service, and sending the at least one group service to the terminal device.

With reference to the fourth aspect, in a first possible implementation manner of the fourth aspect, the method further includes sending configuration information of the first message such that the terminal device receives the first message according to the configuration information of the first message, where the configuration information of the first message includes at least one of a time pattern for sending the first message, a first RNTI, and a modulation and coding scheme of the first message.

With reference to the first possible implementation manner of the fourth aspect, in a second possible implementation manner of the fourth aspect, the time pattern for sending the first message includes at least one of a change period of the first message, a repetition coefficient for sending the first message, and a time offset of the first message.

With reference to any one of the fourth aspect or the first to the second possible implementation manners of the fourth aspect, in a third possible implementation manner of the fourth aspect, the first message further includes at least one of a period for sending the first message, a change period of the first message, a time offset of each group service corresponding to the at least one group service identifier, a second RNTI, and a logical channel number of each group service.

With reference to any one of the fourth aspect or the first to the third possible implementation manners of the fourth aspect, in a fourth possible implementation manner of the fourth aspect, the method further includes sending indication information indicating that the first message is changed to the terminal device, including sending a paging message carrying the indication information to the terminal device, sending an SIB1 message carrying the indication information to the terminal device, or sending first downlink control information carrying the indication information to the terminal device.

Based on the foregoing technical solution, a terminal device receives a first message that is sent by a network device and that includes a group service identifier of each group service sent by the network device such that the terminal device can receive, according to the received first message, a group service sent by the network device. Therefore, implementations of the present disclosure provide a method for implementing group communication, a terminal device, and a network device. In this way, not only point-to-multipoint group communication in a single cell can be implemented, but also one group service can be sent using only one share of resources to all terminal devices that need to receive the group service, thereby reducing a waste of radio resources. In addition, receiving configuration of each group service can further be modified using a unified configuration message, thereby implementing dynamic, flexible, and efficient group service configuration and transmission.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that in the embodiments of the present disclosure, a terminal equipment may be UE, a customer premise equipment (CPE), a mobile station (MS), a mobile terminal, or the like. The terminal equipment may communicate with one or more core networks using a radio access network (RAN). For example, the terminal equipment may be a mobile phone (or referred to as a "cellular" phone), or a computer with a mobile terminal. For example, the terminal equipment may be a portable, pocket-sized, handheld, computer built-in, or in-vehicle mobile apparatus, and it exchanges voice and/or data with the RAN. However, the present disclosure is not limited thereto. For ease of description, UE is used as an example in the following embodiments.

In the embodiments of the present disclosure, the network device may be a base station, an enhanced base station, a cell, a relay, or the like. The base station may be an evolved Node B (eNB or e-NodeB) in long term evolution (LTE), and is not limited in the present disclosure. For convenience of description, the following embodiments are described using an eNB as an example.

It should be understood that, the terms "system" and "network" may be used interchangeably in this specification. The term "and/or" in this specification describes only an association relationship for describing associated objects and represents that three relationships may exist. For example, A and/or B may represent the following three cases, where only A exists, both A and B exist, and only B exists. In addition, the character "/" in this specification generally indicates an "or" relationship between the associated objects.

Figure 1:
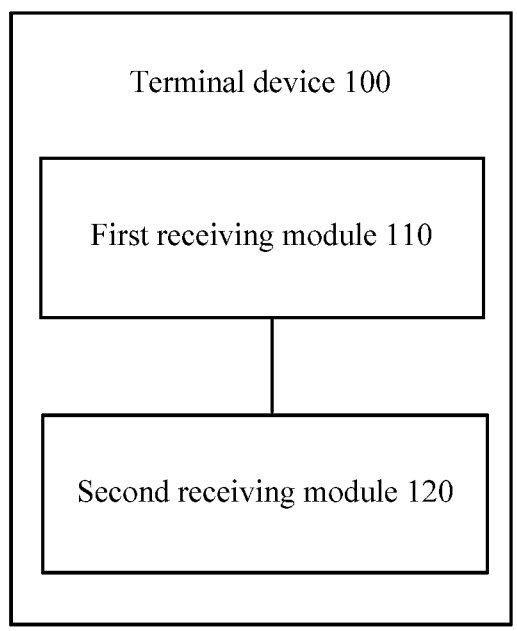
FIG. 1 is a schematic block diagram of a terminal device according to an embodiment of the present disclosure.

FIG. 1 is a schematic block diagram of a terminal device 100 according to an embodiment of the present disclosure. As shown in FIG. 1, the terminal device 100 includes a first receiving module 110 and a second receiving module 120.

The first receiving module 110 is configured to receive a first message sent by a network device. The first message includes at least one group service identifier, and one group service identifier corresponds to one group service.

The second receiving module 120 is configured to receive, according to the first message received by the first receiving module 110, a first group service corresponding to a first group service identifier of the terminal device 100.

Further, the first message sent by the network device may include a group service identifier list. The group service identifier list includes a group service identifier of at least one group service to be sent by the network device. The group service identifier list may include one or more group service identifiers, and one group service identifier corresponds to one group service. It should be understood that the first message may be an independent broadcast message, or may be carried in a form of specific information in another broadcast message. Further, the first message may be a multicast control channel (MCCH) message, a group configuration message, a multicast control message, or a multicast configuration message, and the present disclosure is not limited thereto. Further, the group service identifier list may be a temporary mobile group identity (TMGI) list including a TMGI corresponding to the at least one group service, and the present disclosure is not limited thereto. The first group service identifier of the terminal device 100 refers to a group service identifier of interest to or a group service identifier subscribed to by the terminal device 100. Further, the terminal device 100 obtains, from a user service description (USD), the group service identifier of interest or the subscribed group service identifier.

In the second receiving module 120, the terminal device 100 distinguishes and identifies, according to a group service identifier in the first message, a group service needing to be received. In this way, the terminal device 100 receives a group service intended to be received.

Based on the foregoing technical solution, the terminal device 100 receives a first message that is sent by a network device and that includes a group service identifier of each group service sent by the network device such that the terminal device 100 can receive, according to the received first message, a group service sent by the network device.

Therefore, implementations of the present disclosure provide a method for implementing group communication, a terminal device, and a network device. In this way, not only point-to-multipoint group communication in a single cell can be implemented, but also one group service can be sent using only one share of resources to all terminal devices that need to receive the group service, thereby reducing a waste of radio resources. In addition, receiving configuration of each group service can further be modified using a unified configuration message, thereby implementing dynamic, flexible, and efficient group service configuration and transmission.

Figure 2:
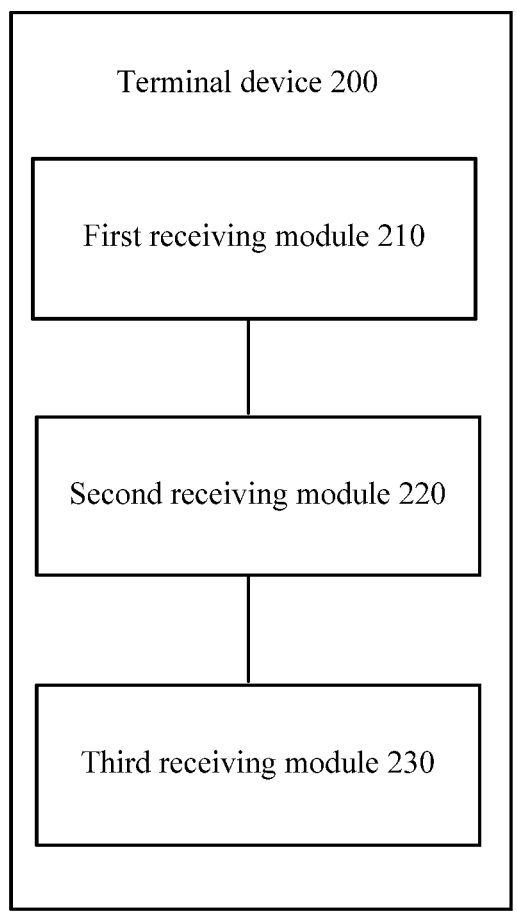
FIG. 2 is a schematic block diagram of a terminal device according to another embodiment of the present disclosure.

Optionally, in an embodiment of the present disclosure, FIG. 2 is a schematic block diagram of a terminal device 200 according to an embodiment of the present disclosure. As shown in FIG. 2, the terminal device 200 includes a first receiving module 210, a second receiving module 220, and a third receiving module 230.

The first receiving module 210 is configured to receive a first message sent by a network device. The first message includes at least one group service identifier, and one group service identifier corresponds to one group service.

The second receiving module 220 is configured to receive, according to the first message received by the first receiving module 210, a first group service corresponding to a first group service identifier of the terminal device 200.

The third receiving module 230 is configured to receive configuration information of the first message such that the first receiving module 210 of the terminal device 200 receives the first message according to the configuration information of the first message. The configuration information of the first message received by the third receiving module 230 includes at least one of a time pattern that is used by the network device to send the first message, a modulation and coding scheme of the first message, and a first RNTI. The modulation and coding scheme of the first message may be as follows. For example, a modulation scheme of the first message is quadrature phase shift keying (QPSK), and a coding scheme is 1/3 coding, or a modulation scheme of the first message is QPSK, and a coding scheme is 1/2 coding. It should be understood that other coding or modulation schemes may also be used, and the present disclosure is not limited thereto. The first RNTI refers to an RNTI used by the network device to schedule and send the first message.

Optionally, in an embodiment of the present disclosure, the time pattern that is used by the network device to send the first message and that is received by the third receiving module 230 includes at least one of a change period of the first message, a repetition coefficient for sending the first message, and a time offset of the first message. The change period T' of the first message is used to instruct the terminal device 200 to receive, after determining that the first message is changed, a changed first message sent by the network device, after the change period T' has elapsed. Further, the period T' may be 20 milliseconds (ms), 50 ms, 100 ms, 500 ms, or the like. A quantity of repetition times for sending the first message represents a number of times the first message is repeatedly sent within one change period T', and for example, may be 2, 4, 6, 8, or the like. The time offset of the first message is, for example, 0 ms, 1 ms, 2 ms, 3 ms, or the like. When the time pattern of the first message does not include the time offset of the first message, the time offset of the first message is a fixed value of, for example, 0 or 1. It should also be understood that the values listed above are merely examples, other possible values of the change period T' all fall within the protection scope of the present disclosure, and the present disclosure is not limited thereto.

Optionally, in an embodiment of the present disclosure, the first receiving module 210 further includes a first receiving unit (not shown).

When the configuration information received by the third receiving module 230 includes the first RNTI, the first receiving unit is configured to receive first downlink control information according to the first RNTI. When the configuration information received by the third receiving module 230 does not include the first RNTI, the first receiving unit is configured to receive first downlink control information according to a first default RNTI. Further, if the configuration information includes the first RNTI, the terminal device 200 parses the first downlink control information according to an RNTI corresponding to the first group service in the first RNTI in order to receive the first message according to the first downlink control information. If the first message does not include the first RNTI, the terminal device 200 receives the first downlink control information according to the first default RNTI. The first downlink control information is downlink control information used to schedule the first message. The first default RNTI is a default RNTI used by the network device to schedule and send the first message. For example, the first default RNTI may be FFF4, FFFC, or the like, and the present disclosure is not limited thereto.

Based on the foregoing technical solution, the terminal device 200 receives a first message that is sent by a network device and that includes a group service identifier of each group service sent by the network device such that the terminal device 200 can receive, according to the received first message, a group service sent by the network device. Therefore, implementations of the present disclosure provide a method for implementing group communication, a terminal device, and a network device. In this way, not only point-to-multipoint group communication in a single cell can be implemented, but also one group service can be sent using only one share of resources to all terminal devices that need to receive the group service, thereby reducing a waste of radio resources. In addition, receiving configuration of each group service can further be modified using a unified configuration message, thereby implementing dynamic, flexible, and efficient group service configuration and transmission.

Optionally, in an embodiment of the present disclosure, when the at least one group service identifier sent by the network device includes the first group service identifier of the terminal device 200, the second receiving module 220 of the terminal device 200 is configured to receive the first group service according to the first message received by the first receiving module 210.

It should be understood that when the group service identifier list sent by the network device does not include a group service identifier of the terminal device 200, the terminal device 200 does not receive group service data sent by the network device, and only when the group service identifier list sent by the network device includes a group service identifier of the terminal device 200, the terminal device 200 receives group service data that is sent by the network device and that corresponds to the group service identifier of the terminal device 200. For example, when group services to be sent by the network device are group service A, group service B, and group service C, the group service identifier list includes three group service identifiers A, B, and C. Three group service identifiers A, B, and D may be marked in advance for the terminal device 200 according to a requirement of the terminal device 200. In this case, the terminal device 200 receives only service A and service B that are sent by a network side device, and cannot receive service C.

Optionally, in an embodiment of the present disclosure, the first message received by the first receiving module 210 further includes at least one of a period for sending the first message by the network device, a change period of the first message, a time offset of each group service corresponding to the at least one group service identifier, a logical channel number of each group service, and a second RNTI. The period T for sending the first message by the network device represents frequency at which the first message is used to send a message. Further, the period T may be 20 ms, 50 ms, 100 ms, 500 ms, or the like. For the change period T' of the first message, the period T' is used to instruct the terminal device to receive, after determining that the first message is changed, a changed first message sent by the network device, after the change period T' has elapsed. Further, the period T' may be 20 ms, 50 ms, 100 ms, 500 ms, or the like. The logical channel number of each group service that is sent by the network device is used to represent a logical channel used by the group service. The logical channel number may be represented by 12 bits, for example, 000000000001, or by 5 bits, for example, 00001, or by any bit quantity ranging from 6 to 13. The bit quantity used may be a length preset by a network, or a length indicated by the first message. The second RNTI refers to an RNTI used to schedule the group service sent by the network device. It should be understood that the second RNTI may refer to one RNTI used to schedule multiple group services, or may refer to different RNTIs used to schedule multiple group services. That is, each group service has a corresponding RNTI, and each RNTI may correspond to one or more group services, and the present disclosure is not limited thereto. It should also be understood that the values listed above are merely examples, other possible values of the period T or T' all fall within the protection scope of the present disclosure, and the present disclosure is not limited thereto.

Optionally, in an embodiment of the present disclosure, the second receiving module 220 of the terminal device 200 includes a second receiving unit (not shown). When the first message sent by the network device includes the second RNTI, the second receiving unit is configured to receive second downlink control information according to the second RNTI. When the first message does not include the second RNTI, the second receiving unit is configured to receive second downlink control information according to a second default RNTI. Further, if the terminal device needs to receive the first group service corresponding to the first group service identifier when the first message includes the second RNTI, the terminal device parses the second downlink control information according to an RNTI corresponding to the first group service in the second RNTI in order to receive the first group service according to the second downlink control information. If the first message does not include the second RNTI, the terminal device receives the second downlink control information according to the second default RNTI. The second downlink control information is downlink control information used to schedule group service data sent by the network device. The second default RNTI is a default RNTI used to schedule the group service sent by the network device. For example, the second default RNTI may be FFF4, FFFC, or the like, and the present disclosure is not limited thereto.

Further, receiving second downlink control information according to the second RNTI or a second default RNTI includes parsing, at a scheduling time corresponding to the first group service, the second downlink control information that is scrambled with the RNTI of the first group service. The scheduling time of the first group service is a moment that is obtained by performing a modulo operation on the period T using a sum of a system frame number*10 and a subframe index of the first group service and that is equal to the time offset corresponding to the first group service.

Optionally, in an embodiment of the present disclosure, the second receiving module 220 further includes a third receiving unit (not shown), the third receiving unit being configured to receive, according to the second downlink control information received by the second receiving unit, a MAC PDU received by the second receiving module 220, and obtain, according to a logical channel number of the first group service in the at least one group service received by the second receiving unit, a MAC SDU received by the second receiving module 220 when the first message received by the first receiving module 210 includes the logical channel number of each group service in the at least one group service, or obtain, according to the first group service identifier, a MAC SDU of the first group service received by the second receiving module 220 when the first message received by the first receiving module 210 does not include the logical channel number of each group service in the at least one group service. It should be understood that the MAC PDU refers to a packet data unit including a MAC SDU of the at least one group service, and the present disclosure is not limited thereto.

Further, for example, when the first message received by the terminal device 200 includes logical channel numbers A, B, and C of group service A, group service B, and group service C that are sent by the network device, a corresponding channel A can be found using the channel number A corresponding to group service A, the channel number B corresponding to group service B and channel C corresponding to group service C, and a MAC SDU received by the second receiving module is obtained. In this case, if the first message does not include the logical channel numbers, group services A, B, and C all obtain, according to their group service identifiers and using a channel allocated to an entire group service, a MAC SDU that corresponds to the group service and that is received by the second receiving module 220.

In an embodiment of the present disclosure, optionally, the MAC PDU received by the second receiving module 220 carries a MAC CE to indicate that the first group service ends. The MAC PDU including the MAC CE indicating that the service ends may be sent once, or may be repeatedly sent multiple times, for example, three times or five times in order to improve receiving reliability of the terminal device 200. A specific implementation manner may be that the MAC CE includes a group service identifier or a logical channel number of a group service sent by the terminal device 200, and when the terminal device 200 receives a MAC CE including a particular group service identifier or logical channel number, it is considered that the service ends. Alternatively, a specific implementation manner may be that when the MAC CE does not include a group service identifier or a logical channel number corresponding to a group service sent by the terminal device 200, it is considered that all group services included in the MAC PDU that includes the MAC CE indicating that the service ends end. It should be understood that the numerals mentioned in this embodiment of the present disclosure are merely examples. It should also be understood that the MAC CE is a MAC control unit indicating that the at least one group service ends, and the present disclosure is not limited thereto.

In an embodiment of the present disclosure, optionally, the terminal device 200 further includes a determining module (not shown). The determining module is configured to determine, according to a change indication message, that the first message received by the first receiving module 210 is changed. The change indication information includes indication information that indicates that the first message is changed and that is carried in a paging message, indication information that indicates that the first message is changed and that is carried in an SIB1, or indication information that indicates that the first message is changed and that is carried in the first downlink control information, when the second receiving module 220 receives the first downlink control information. The change indication message of the first message that is carried in the SIB1 message or the indication information that indicates that the first message is changed and that is carried in the downlink control information of the first message may be further a label value, whose length may be 4 bits, 5 bits, or the like. The downlink control information may be in a format such as 1/1A/1C. Further, the terminal device 200 compares a stored label value with the label value in the change indication message of the first message that is carried in the SIB1 message or the indication information that indicates that the first message is changed and that is carried in the downlink control information of the first message. If they are different, it is considered that the first message is changed. It should be understood that the length values of the foregoing representation value are merely examples, and the present disclosure is not limited thereto.

In an embodiment of the present disclosure, optionally, the first receiving module 210 is further configured to receive the first message at a moment at which the network device sends multicast control information if the terminal device 200 does not store the first message, and receive a changed first message at a moment at which the network device sends the changed first message in order to receive a changed first group service according to the changed first message if the terminal device 200 already stores the multicast control information and determines that the first message is changed. If the terminal device 200 does not store the first message, the terminal device 200 needs to attempt to receive the first message at each first message sending moment, until one first message is correctly received. The terminal device 200 may obtain the first message sending moment using an SIB1 message, or obtain the first message sending moment from the configuration information of the first message scheduled by the downlink control information in order to attempt to receive the first message at the first message sending moment. If the terminal device 200 already stores the first message, when determining that the first message is changed, the terminal device 200 needs to start to receive a changed first message after the change period T' has elapsed in order to receive the first group service according to the changed first message.

Optionally, in an embodiment of the present disclosure, to improve reliability of UE in receiving the first message, when the network device sends the first message for a quantity of times that equals to the repetition coefficient in one change period T', different redundancy versions may be used each time the first message is sent. In this way, the terminal device can correctly receive the first message by combining multiple first messages, thereby improving reliability of a user in receiving the first message.

Optionally, in an embodiment of the present disclosure, to improve reliability of UE in receiving the first message, the first message is sent in N consecutive subframes starting from a subframe corresponding to each first message scheduling moment. The first messages sent in the subframes may be the same, or different redundancy versions may be used. In this way, the terminal device 200 can correctly receive the first message by combining multiple first messages, thereby improving reliability of a user in receiving the first message.

Based on the foregoing technical solution, the terminal device 200 receives a first message that is sent by a network device and that includes a group service identifier of each group service sent by the network device such that the terminal device 200 can receive, according to the received first message, a group service sent by the network device. Therefore, implementations of the present disclosure provide a method for implementing group communication, a terminal device, and a network device. In this way, not only point-to-multipoint group communication in a single cell can be implemented, but also one group service can be sent using only one share of resources to all terminal devices that need to receive the group service, thereby reducing a waste of radio resources. In addition, receiving configuration of each group service can further be modified using a unified configuration message, thereby implementing dynamic, flexible, and efficient group service configuration and transmission.

The terminal device according to the embodiments of the present disclosure is described in detail above with reference to FIG. 1 and FIG. 2. A network device according to the embodiments of the present disclosure is described in detail below with reference to FIG. 3 and FIG. 4.

Figure 3:
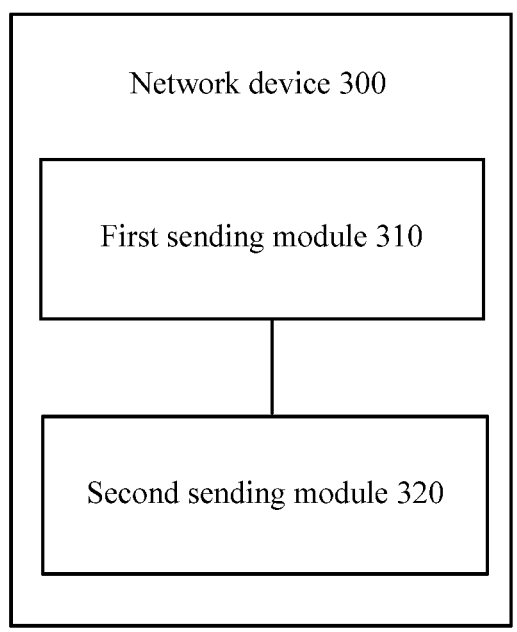
FIG. 3 is a schematic block diagram of a network device according to an embodiment of the present disclosure.

FIG. 3 is a schematic block diagram of a network device 300 according to an embodiment of the present disclosure. As shown in FIG. 3, the network device 300 includes a first sending module 310 and a second sending module 320.

The first sending module 310 is configured to send a first message to a terminal device. The first message includes at least one group service identifier, and one group service identifier corresponds to one group service.

The second sending module 320 is configured to send a group service corresponding to the at least one group service identifier to the terminal device.

Further, the first message sent by the first sending module 310 of the network device 300 may include a group service identifier list. The group service identifier list includes a group service identifier of at least one group service to be sent by the network device 300. The group service identifier list may include one or more group service identifiers, and one group service identifier corresponds to one group service. It should be understood that the first message may be an independent broadcast message, or may be carried in a form of specific information in another broadcast message. Further, the first message may be an MCCH message or a group configuration message, and the present disclosure is not limited thereto. Further, the group service identifier list may be a TMGI list including a TMGI corresponding to the at least one group service, and the present disclosure is not limited thereto. The group service sent by the second sending module 320 of the network device 300 is group services corresponding to one or more group service identifiers included in the group service identifier list. One group service identifier corresponds to one group service.

Based on the foregoing technical solution, a terminal device receives a first message that is sent by the network device 300 and that includes a group service identifier of each group service sent by the network device 300 such that the terminal device can receive, according to the received first message, a group service sent by the network device 300. Therefore, implementations of the present disclosure provide a method for implementing group communication, a terminal device, and a network device. In this way, not only point-to-multipoint group communication in a single cell can be implemented, but also one group service can be sent using only one share of resources to all terminal devices that need to receive the group service, thereby reducing a waste of radio resources. In addition, receiving configuration of each group service can further be modified using a unified configuration message, thereby implementing dynamic, flexible, and efficient group service configuration and transmission.

Figure 4:
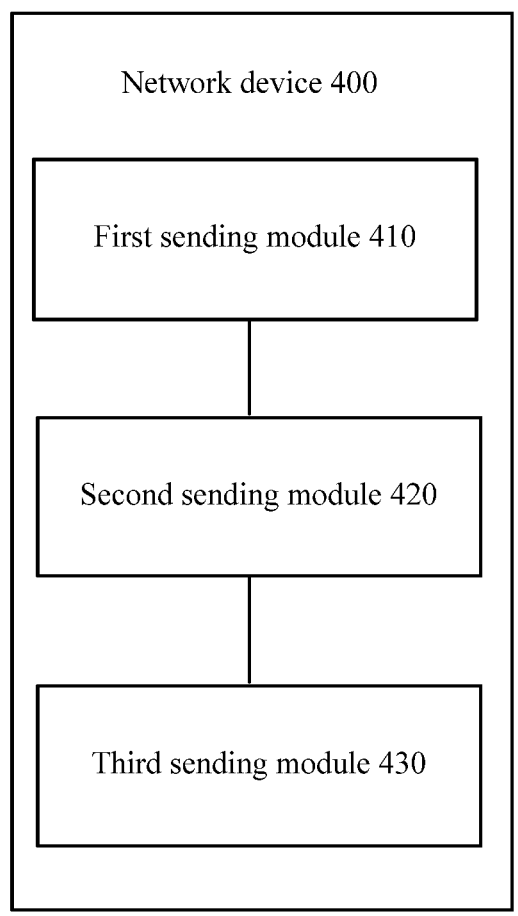
FIG. 4 is a schematic block diagram of a network device according to another embodiment of the present disclosure.

Optionally, in an embodiment of the present disclosure, FIG. 4 is a schematic block diagram of a network device 400 according to another embodiment of the present disclosure. The network device 400 includes a first sending module 410, a second sending module 420, and a third sending module 430.

The first sending module 410 is configured to send a first message to a terminal device. The first message includes at least one group service identifier, and one group service identifier corresponds to one group service.

The second sending module 420 is configured to send a group service corresponding to the at least one group service identifier to the terminal device.

The third sending module 430 is configured to send configuration information of the first message such that the terminal device receives the first message according to the configuration information of the first message. The configuration information of the first message includes at least one of a time pattern for sending the first message, a modulation and coding scheme of the first message, and a first RNTI. The modulation and coding scheme of the first message may be further as follows. For example, a modulation scheme of the first message is QPSK, and a coding scheme is 1/3 coding, or a modulation scheme of the first message is QPSK, and a coding scheme is 1/2 coding. It should be understood that other coding or modulation schemes may also be used, and the present disclosure is not limited thereto. The first RNTI refers to an RNTI used by the network device to schedule and send the first message.

Optionally, in an embodiment of the present disclosure, the time pattern for sending the first message by the third sending module 430 includes at least one of a change period of the first message, a repetition coefficient for sending the first message, and a time offset of the first message. The change period T' of the first message is used to instruct the terminal device to receive, after determining that the first message is changed, a changed first message sent by the network device 400, after the change period T' has elapsed. Further, the period T' may be 20 ms, 50 ms, 100 ms, 500 ms, or the like. A quantity of repetition times for sending the first message represents a number of times the first message is repeatedly sent within one change period T', and for example, may be further 2, 4, 6, 8, or the like. The time offset of the first message is, for example, 0 ms, 1 ms, 2 ms, 3 ms, or the like. When the time pattern of the first message does not include the time offset of the first message, the time offset of the first message is a fixed value of, for example, 0 or 1. It should also be understood that the values listed above are merely examples, other possible values of the change period T' all fall within the protection scope of the present disclosure, and the present disclosure is not limited thereto.

Optionally, in an embodiment of the present disclosure, the first message sent by the first sending module 410 further includes at least one of a period for sending the first message, a change period of the first message, a time offset of each group service in the at least one group service, a logical channel number of each group service, and a second RNTI. The period T for sending the first message by the network device 400 represents frequency at which the first message is used to send a message. Further, the period T may be 20 ms, 50 ms, 100 ms, 500 ms, or the like. For the change period T' of the first message, the period T' is used to instruct the terminal device to receive, after determining that the first message is changed, a changed first message sent by the network device 400, after the change period T' has elapsed. Further, the period T' may be 20 ms, 50 ms, 100 ms, 500 ms, or the like. The logical channel number of each group service that is sent by the network device 400 is used to represent a logical channel used by the group service. The second RNTI refers to an RNTI used to schedule the group service sent by the network device 400. It should be understood that the second RNTI may refer to one RNTI used to schedule multiple group services, or may refer to different RNTIs used to schedule multiple group services. That is, each group service has a corresponding RNTI, and each RNTI may correspond to one or more group services, and the present disclosure is not limited thereto. It should also be understood that the values listed above are merely examples, other possible values of the period T or T' all fall within the protection scope of the present disclosure, and the present disclosure is not limited thereto.

Optionally, in an embodiment of the present disclosure, the first sending module 410 is further configured to send indication information indicating that the first message is changed to the terminal device, including sending a paging message carrying the indication information to the terminal device, sending an SIB1 message carrying the indication information to the terminal device, or sending first downlink control information carrying the indication information to the terminal device. The change indication message of the first message that is carried in the SIB1 message or the indication information that indicates that the first message is changed and that is carried in the first downlink control information may be further a label value, whose length may be 4 bits, 5 bits, or the like. The downlink control information may be in a format such as 1/1A/1C. Further, the terminal device compares a stored label value with the label value in the change indication message of the first message that is carried in the SIB1 message or the indication information that indicates that the first message is changed and that is carried in the first downlink control information. If they are different, it is considered that the first message is changed. It should be understood that the length values of the foregoing representation value are merely examples, and the present disclosure is not limited thereto.

Optionally, in an embodiment of the present disclosure, to improve reliability of UE in receiving the first message, when the network device 400 sends the first message for a quantity of times that equals to the repetition coefficient in one change period T', different redundancy versions may be used each time the first message is sent. In this way, the terminal device can correctly receive the first message by combining multiple first messages, thereby improving reliability of a user in receiving the first message.

Optionally, in an embodiment of the present disclosure, to improve reliability of UE in receiving the first message, the first message is sent in N consecutive subframes starting from a subframe corresponding to each first message scheduling moment. The first messages sent in the subframes may be the same, or different redundancy versions may be used. In this way, the terminal device can correctly receive the first message by combining multiple first messages, thereby improving reliability of a user in receiving the first message.

Based on the foregoing technical solution, a terminal device receives a first message that is sent by the network device 400 and that includes a group service identifier of each group service sent by the network device 400 such that the terminal device can receive, according to the received first message, a group service sent by the network device 400. Therefore, implementations of the present disclosure provide a method for implementing group communication, a terminal device, and a network device. In this way, not only point-to-multipoint group communication in a single cell can be implemented, but also one group service can be sent using only one share of resources to all terminal devices that need to receive the group service, thereby reducing a waste of radio resources. In addition, receiving configuration of each group service can further be modified using a unified configuration message, thereby implementing dynamic, flexible, and efficient group service configuration and transmission.

FIG. 1 to FIG. 4 describes in detail the network device and the terminal device. A schematic flowchart of a group communication method according to an embodiment of the present disclosure is described below with reference to FIG. 5 and FIG. 6.

Figure 5:
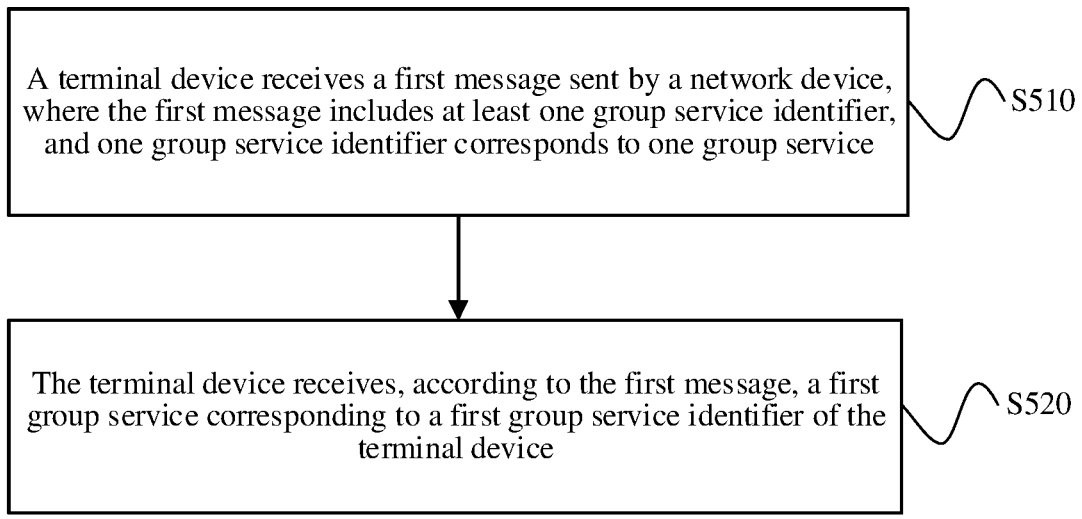
FIG. 5 is a schematic flowchart of a group communication method according to an embodiment of the present disclosure.

FIG. 5 is a schematic flowchart of a group communication method according to an embodiment of the present disclosure. Procedures in the method 500 may be separately executed and implemented by corresponding parts of the terminal device 100 or the terminal device 200 according to the embodiments of the present disclosure. For brevity, details are not described herein again. As shown in FIG. 5, the method 500 includes the following steps.

Step S510: A terminal device receives a first message sent by a network device, where the first message includes at least one group service identifier, and one group service identifier corresponds to one group service.

Step S520: The terminal device receives, according to the first message, a first group service corresponding to a first group service identifier of the terminal device.

Further, the first message sent by the network device may include a group service identifier list. The group service identifier list includes a group service identifier of at least one group service to be sent by the network device. The group service identifier list may include one or more group service identifiers, and one group service identifier corresponds to one group service. It should be understood that the first message may be an independent broadcast message, or may be carried in a form of specific information in another broadcast message. Further, the first message may be a MCCH message or a multicast configuration message, and the present disclosure is not limited thereto. Further, the group service identifier list may be a TMGI list including a TMGI corresponding to the at least one group service, and the present disclosure is not limited thereto. The first group service identifier of the terminal device refers to a group service identifier of interest to or a group service identifier subscribed to by the terminal device. Further, the terminal device obtains, from a USD, the group service identifier of interest or the subscribed group service identifier.

In step S520, the terminal device distinguishes and identifies, according to a group service identifier in the first message, a group service needing to be received. In this way, the terminal device receives a group service intended to be received.

Based on the foregoing technical solution, a terminal device receives a first message that is sent by a network device and that includes a group service identifier of each group service sent by the network device such that the terminal device can receive, according to the received first message, a group service sent by the network device. Therefore, implementations of the present disclosure provide a method for implementing group communication, a terminal device, and a network device. In this way, not only point-to-multipoint group communication in a single cell can be implemented, but also one group service can be sent using only one share of resources to all terminal devices that need to receive the group service, thereby reducing a waste of radio resources. In addition, receiving configuration of each group service can further be modified using a unified configuration message, thereby implementing dynamic, flexible, and efficient group service configuration and transmission.

Optionally, in an embodiment of the present disclosure, before step S510, the terminal device receives configuration information of the first message in order to receive the first message according to the configuration information of the first message. The configuration information of the first message includes at least one of a time pattern that is used by the network device to send the first message, a modulation and coding scheme of the first message, and a first RNTI. The modulation and coding scheme of the first message may be as follows. For example, a modulation scheme of the first message is QPSK, and a coding scheme is 1/3 coding, or a modulation scheme of the first message is QPSK, and a coding scheme is 1/2 coding. It should be understood that other coding or modulation schemes may also be used, and the present disclosure is not limited thereto. The first RNTI refers to an RNTI used by the network device to schedule and send the first message.

Optionally, in an embodiment of the present disclosure, the time pattern that is used by the network device to send the first message includes at least one of a change period of the first message, a repetition coefficient for sending the first message, and a time offset of the first message. The change period T' of the first message is used to instruct the terminal device to receive, after determining that the first message is changed, a changed first message sent by the network device, after the change period T' has elapsed. Further, the period T' may be 20 ms, 50 ms, 100 ms, 500 ms, or the like. A quantity of repetition times for sending the first message represents a number of times the first message is repeatedly sent within one change period T', and for example, may be 2, 4, 6, 8, or the like. The time offset of the first message is, for example, 0 ms, 1 ms, 2 ms, 3 ms, or the like. When the time pattern of the first message does not include the time offset of the first message, the time offset of the first message is a fixed value of, for example, 0 or 1. It should also be understood that the values listed above are merely examples, other possible values of the change period T' all fall within the protection scope of the present disclosure, and the present disclosure is not limited thereto.

Optionally, in an embodiment of the present disclosure, receiving, by the terminal device, configuration information of the first message in order to receive the first message according to the configuration information of the first message includes receiving, by the terminal device, first downlink control information according to the first RNTI when the configuration information includes the first RNTI, or receiving, by the terminal device, first downlink control information according to a first default RNTI when the configuration information does not include the first RNTI. Further, if the configuration information includes the first RNTI, the terminal device parses the first downlink control information according to an RNTI corresponding to the first group service in the first RNTI in order to receive the first message according to the first downlink control information. If the first message does not include the first RNTI, the terminal device receives the first downlink control information according to the first default RNTI. The first default RNTI is a default RNTI used by the network device to schedule and send the first message. For example, the first default RNTI may be FFF4, FFFC, or the like, and the present disclosure is not limited thereto.

Based on the foregoing technical solution, a terminal device receives a first message that is sent by a network device and that includes a group service identifier of each group service sent by the network device such that the terminal device can receive, according to the received first message, a group service sent by the network device. Therefore, implementations of the present disclosure provide a method for implementing group communication, a terminal device, and a network device. In this way, not only point-to-multipoint group communication in a single cell can be implemented, but also one group service can be sent using only one share of resources to all terminal devices that need to receive the group service, thereby reducing a waste of radio resources. In addition, receiving configuration of each group service can further be modified using a unified configuration message, thereby implementing dynamic, flexible, and efficient group service configuration and transmission.

Optionally, in an embodiment of the present disclosure, in step S520, when the at least one group service identifier sent by the network device includes the first group service identifier of the terminal device, the terminal device is configured to receive the first group service according to the first message received by the terminal device.

It should be understood that when the group service identifier list sent by the network device does not include a group service identifier of the terminal device, the terminal device does not receive group service data sent by the network device, and only when the group service identifier list sent by the network device includes a group service identifier of the terminal device, the terminal device receives group service data that is sent by the network device and that corresponds to the group service identifier of the terminal device. For example, when group services to be sent by the network device are group service A, group service B, and group service C, the group service identifier list includes three group service identifiers A, B, and C. Three group service identifiers A, B, and D may be marked in advance for the terminal device according to a requirement of the terminal device. In this case, the terminal device receives only service A and service B that are sent by a network side device, and cannot receive service C.

Optionally, in an embodiment of the present disclosure, the first message further includes at least one of a period for sending the first message by the network device, a change period of the first message, a time offset of each group service corresponding to the at least one group service identifier, a logical channel number of each group service, and a second RNTI. The period T for sending the first message by the network device represents frequency at which the first message is used to send a message. Further, the period T may be 20 ms, 50 ms, 100 ms, 500 ms, or the like. For the change period T' of the first message, the period T' is used to instruct the terminal device to receive, after determining that the first message is changed, a changed first message sent by the network device, after the change period T' has elapsed. Further, the period T' may be 20 ms, 50 ms, 100 ms, 500 ms, or the like. The logical channel number of each group service that is sent by the network device is used to represent a logical channel used by the group service. The logical channel number may be represented by 12 bits, for example, 000000000001, or by 5 bits, for example, 00001, or by any bit quantity ranging from 6 to 13. The bit quantity used may be a length preset by a network, or a length indicated by the first message. The second RNTI refers to an RNTI used to schedule the group service sent by the network device. It should be understood that the second RNTI may refer to one RNTI used to schedule multiple group services, or may refer to different RNTIs used to schedule multiple group services. That is, each group service has a corresponding RNTI, and each RNTI may correspond to one or more group services, and the present disclosure is not limited thereto. It should also be understood that the values listed above are merely examples, other possible values of the period T or T' all fall within the protection scope of the present disclosure, and the present disclosure is not limited thereto.

Optionally, in an embodiment of the present disclosure, in step S520, receiving, by the terminal device according to the first message, a first group service corresponding to a first group service identifier of the terminal device includes receiving, by the terminal device, second downlink control information according to the second RNTI when the first message includes the second RNTI, or receiving, by the terminal device, second downlink control information according to a second default RNTI when the first message does not include the second RNTI. Further, if the terminal device needs to receive the first group service corresponding to the first group service identifier when the first message includes the second RNTI, the terminal device parses the second downlink control information according to an RNTI corresponding to the first group service in the second RNTI in order to receive the first group service according to the second downlink control information. If the first message does not include the second RNTI, the terminal device receives the second downlink control information according to the second default RNTI. The second default RNTI is a default RNTI used to schedule the group service sent by the network device. For example, the second default RNTI may be FFF4, FFFC, or the like, and the present disclosure is not limited thereto.

Further, receiving second downlink control information according to the second RNTI or a second default RNTI includes parsing, at a scheduling time corresponding to the first group service, the second downlink control information that is scrambled with the RNTI of the first group service. The scheduling time of the first group service is a moment that is obtained by performing a modulo operation on the period T using a sum of a system frame number*10 and a subframe index of the first group service and that is equal to the time offset corresponding to the first group service.

Optionally, in an embodiment of the present disclosure, in step S520, receiving, by the terminal device according to the first message, a first group service corresponding to a first group service identifier of the terminal device includes receiving, by the terminal device, a MAC PDU according to the second downlink control information, and receiving, by the terminal device according to a logical channel number of the first group service in the logical channel number of each group service, a MAC SDU sent by the network device when the first message includes the logical channel number of each group service, or receiving, by the terminal device, a MAC SDU of the first group service according to the first group service identifier when the first message does not include the logical channel number of each group service.

Further, for example, when the first message received by the terminal device includes logical channel numbers A, B, and C of group service A, group service B, and group service C that are sent by the network device, a corresponding channel A can be found using the channel number A corresponding to group service A, the channel number B corresponding to group service B and channel C corresponding to group service C, and a MAC SDU is obtained. In this case, if the first message does not include the logical channel numbers, group services A, B, and C all obtain, according to their group service identifiers and using a channel allocated to an entire group service, a MAC SDU that corresponds to the group service.

In an embodiment of the present disclosure, optionally, in step S520, the MAC PDU carries a MAC CE, to indicate that the first group service ends. The MAC PDU including the MAC CE indicating that the service ends may be sent once, or may be repeatedly sent multiple times, for example, three times or five times in order to improve receiving reliability of the terminal device. A specific implementation manner may be that the MAC CE includes a group service identifier or a logical channel number of a group service sent by the terminal device, and when the terminal device receives a MAC CE including a particular group service identifier or logical channel number, it is considered that the service ends. Alternatively, a specific implementation manner may be that when the MAC CE does not include a group service identifier or a logical channel number corresponding to a group service sent by the terminal device, it is considered that all group services included in the MAC PDU that includes the MAC CE indicating that the service ends end. It should be understood that the numerals mentioned in this embodiment of the present disclosure are merely examples, and the present disclosure is not limited thereto.

Optionally, in an embodiment of the present disclosure, the terminal device determines, according to change indication information, that the first message is changed. The change indication information includes indication information that indicates that the first message is changed and that is carried in a paging message, indication information that indicates that the first message is changed and that is carried in SIB1, or indication information that indicates that the first message is changed and that is carried in the first downlink control information, when the terminal device receives the first downlink control information. The change indication message of the first message that is carried in the SIB1 message or the indication information that indicates that the first message is changed and that is carried in the first downlink control information may be a label value, whose length may be 4 bits, 5 bits, or the like. The downlink control information may be in a format such as 1/1A/1C. Further, the terminal device compares a stored label value with the label value in the change indication message of the first message that is carried in the SIB1 message or the indication information that indicates that the first message is changed and that is carried in the downlink control information of the first message. If they are different, it is considered that the first message is changed. It should be understood that the length values of the foregoing representation value are merely examples, and the present disclosure is not limited thereto.

Optionally, in an embodiment of the present disclosure, receiving, by a terminal device, a first message sent by a network device includes receiving the first message at a moment at which the network device sends multicast control information if the terminal device does not store the first message, and receiving a changed first message at a moment at which the network device sends the changed first message in order to receive a changed first group service according to the changed first message if the terminal device already stores the multicast control information and determines that the first message is changed. If the terminal device does not store the first message, the terminal device needs to attempt to receive the first message at each first message sending moment, until one first message is correctly received. The terminal device may obtain the first message sending moment using an SIB1 message, or obtain the first message sending moment from the configuration information of the first message scheduled by the downlink control information in order to attempt to receive the first message at the first message sending moment. If the terminal device already stores the first message, when determining that the first message is changed, the terminal device needs to start to receive a changed first message after the change period T' has elapsed in order to receive the first group service according to the changed first message.

Optionally, in an embodiment of the present disclosure, to improve reliability of UE in receiving the first message, when the network device sends the first message for a quantity of times that equals to the repetition coefficient in one change period T', different redundancy versions may be used each time the first message is sent. In this way, the terminal device can correctly receive the first message by combining multiple first messages, thereby improving reliability of a user in receiving the first message.

Optionally, in an embodiment of the present disclosure, to improve reliability of UE in receiving the first message, the first message is sent in N consecutive subframes starting from a subframe corresponding to each first message scheduling moment. The first messages sent in the subframes may be the same, or different redundancy versions may be used. In this way, the terminal device can correctly receive the first message by combining multiple first messages, thereby improving reliability of a user in receiving the first message.

Based on the foregoing technical solution, a terminal device receives a first message that is sent by a network device and that includes a group service identifier of each group service sent by the network device such that the terminal device can receive, according to the received first message, a group service sent by the network device. Therefore, implementations of the present disclosure provide a method for implementing group communication, a terminal device, and a network device. In this way, not only point-to-multipoint group communication in a single cell can be implemented, but also one group service can be sent using only one share of resources to all terminal devices that need to receive the group service, thereby reducing a waste of radio resources. In addition, receiving configuration of each group service can further be modified using a unified configuration message, thereby implementing dynamic, flexible, and efficient group service configuration and transmission.

Figure 6:
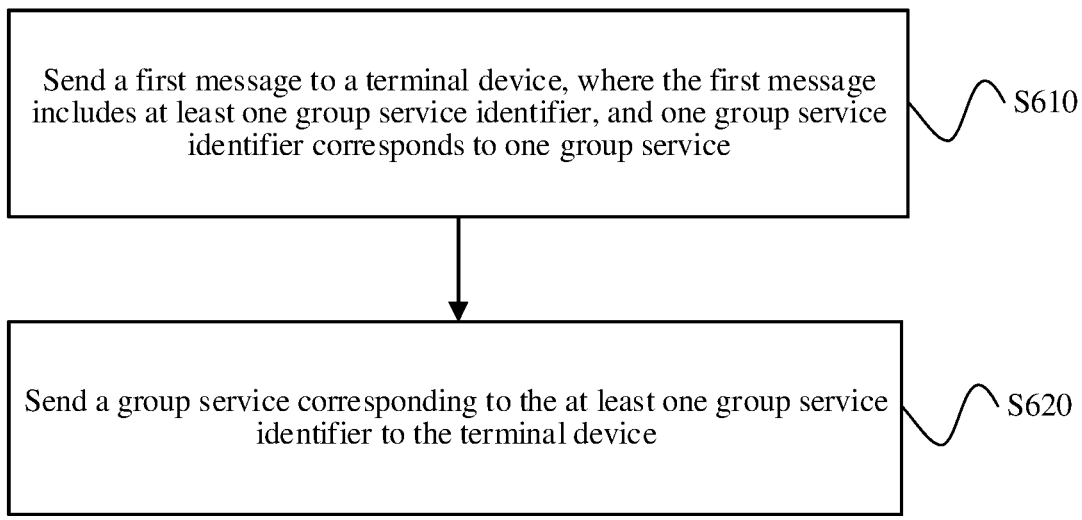
FIG. 6 is a schematic flowchart of a group communication method according to another embodiment of the present disclosure.

FIG. 6 is a schematic flowchart of a group communication method according to another embodiment of the present disclosure. Procedures in the method 600 may be separately executed and implemented by corresponding parts of the network device 300 or the network device 400 according to the embodiments of the present disclosure. For brevity, details are not described herein again. As shown in FIG. 6, the method 600 includes the following steps.

Step S610: Send a first message to a terminal device, where the first message includes at least one group service identifier, and one group service identifier corresponds to one group service.

Step S620: Send a group service corresponding to the at least one group service identifier to the terminal device.

Further, the first message sent by the network device may include a group service identifier list. The group service identifier list includes a group service identifier of at least one group service to be sent by the network device. The group service identifier list may include one or more group service identifiers, and one group service identifier corresponds to one group service. It should be understood that the first message may be an independent broadcast message, or may be carried in a form of specific information in another broadcast message. Further, the first message may be an MCCH message or a group configuration message, and the present disclosure is not limited thereto. Further, the group service identifier list may be a TMGI list including a TMGI corresponding to the at least one group service, and the present disclosure is not limited thereto. The group service sent by the network device is group services corresponding to one or more group service identifiers included in the group service identifier list. One group service identifier corresponds to one group service.

Based on the foregoing technical solution, a terminal device receives a first message that is sent by a network device and that includes a group service identifier of each group service sent by the network device such that the terminal device can receive, according to the received first message, a group service sent by the network device. Therefore, implementations of the present disclosure provide a method for implementing group communication, a terminal device, and a network device. In this way, not only point-to-multipoint group communication in a single cell can be implemented, but also one group service can be sent using only one share of resources to all terminal devices that need to receive the group service, thereby reducing a waste of radio resources. In addition, receiving configuration of each group service can further be modified using a unified configuration message, thereby implementing dynamic, flexible, and efficient group service configuration and transmission.

Optionally, in an embodiment of the present disclosure, before step S610, configuration information of the first message is sent such that the terminal device receives the first message according to the configuration information of the first message. The configuration information of the first message includes at least one of a time pattern for sending the first message, a modulation and coding scheme of the first message, and a first RNTI. The modulation and coding scheme of the first message may be further as follows. For example, a modulation scheme of the first message is QPSK, and a coding scheme is 1/3 coding, or a modulation scheme of the first message is QPSK, and a coding scheme is 1/2 coding. It should be understood that other coding or modulation schemes may also be used, and the present disclosure is not limited thereto. The first RNTI refers to an RNTI used by the network device to schedule and send the first message.

Optionally, in an embodiment of the present disclosure, the time pattern for sending the first message includes at least one of a change period of the first message, a repetition coefficient of the first message, and a time offset of the first message. The change period T' of the first message is used to instruct the terminal device to receive, after determining that the first message is changed, a changed first message sent by the network device, after the change period T' has elapsed. Further, the period T' may be 20 ms, 50 ms, 100 ms, 500 ms, or the like. A quantity of repetition times for sending the first message represents a number of times the first message is repeatedly sent within one change period T', and for example, may be 2, 4, 6, 8, or the like. The time offset of the first message is, for example, 0 ms, 1 ms, 2 ms, 3 ms, or the like. When the time pattern of the first message does not include the time offset of the first message, the time offset of the first message is a fixed value of, for example, 0 or 1. It should also be understood that the values listed above are merely examples, other possible values of the change period T' all fall within the protection scope of the present disclosure, and the present disclosure is not limited thereto.

Optionally, in an embodiment of the present disclosure, the first message further includes at least one of a period for sending the first message, a change period of the first message, a time offset of each group service corresponding to the at least one group service identifier, a logical channel number of each group service, and a second RNTI. The period T for sending the first message by the network device represents frequency at which the first message is used to send a message. Further, the period T may be 20 ms, 50 ms, 100 ms, 500 ms, or the like. For the change period T' of the first message, the period T' is used to instruct the terminal device to receive, after determining that the first message is changed, a changed first message sent by the network device, after the change period T' has elapsed. Further, the period T' may be 20 ms, 50 ms, 100 ms, 500 ms, or the like. The logical channel number of each group service that is sent by the network device is used to represent a logical channel used by the group service. The second RNTI refers to an RNTI used to schedule the group service sent by the network device. It should be understood that the second RNTI may refer to one RNTI used to schedule multiple group services, or may refer to different RNTIs used to schedule multiple group services. That is, each group service has a corresponding RNTI, and each RNTI may correspond to one or more group services, and the present disclosure is not limited thereto. It should also be understood that the values listed above are merely examples, other possible values of the period T or T' all fall within the protection scope of the present disclosure, and the present disclosure is not limited thereto.

Optionally, in an embodiment of the present disclosure, step S610 further includes sending a paging message carrying the indication information to the terminal device, sending an SIB1 message carrying the indication information to the terminal device, or sending second downlink control information carrying the indication information to the terminal device. The change indication message of the first message that is carried in the SIB1 message or the indication information that indicates that the first message is changed and that is carried in the second downlink control information may be further a label value, whose length may be 4 bits, 5 bits, or the like. The downlink control information may be in a format such as 1/1A/1C. Further, the terminal device compares a stored label value with the label value in the change indication message of the first message that is carried in the SIB1 message or the indication information that indicates that the first message is changed and that is carried in the downlink control information of the first message. If they are different, it is considered that the first message is changed. It should be understood that the length values of the foregoing representation value are merely examples, and the present disclosure is not limited thereto.

Optionally, in an embodiment of the present disclosure, to improve reliability of UE in receiving the first message, when the network device sends the first message for a quantity of times that equals to the repetition coefficient in one change period T', different redundancy versions may be used each time the first message is sent. In this way, the terminal device can correctly receive the first message by combining multiple first messages, thereby improving reliability of a user in receiving the first message.

Optionally, in an embodiment of the present disclosure, to improve reliability of UE in receiving the first message, the first message is sent in N consecutive subframes starting from a subframe corresponding to each first message scheduling moment. The first messages sent in the subframes may be the same, or different redundancy versions may be used. In this way, the terminal device can correctly receive the first message by combining multiple first messages, thereby improving reliability of a user in receiving the first message.

Based on the foregoing technical solution, a terminal device receives a first message that is sent by a network device and that includes a group service identifier of each group service sent by the network device such that the terminal device can receive, according to the received first message, a group service sent by the network device. Therefore, implementations of the present disclosure provide a method for implementing group communication, a terminal device, and a network device. In this way, not only point-to-multipoint group communication in a single cell can be implemented, but also one group service can be sent using only one share of resources to all terminal devices that need to receive the group service, thereby reducing a waste of radio resources. In addition, receiving configuration of each group service can further be modified using a unified configuration message, thereby implementing dynamic, flexible, and efficient group service configuration and transmission.

Figure 7:
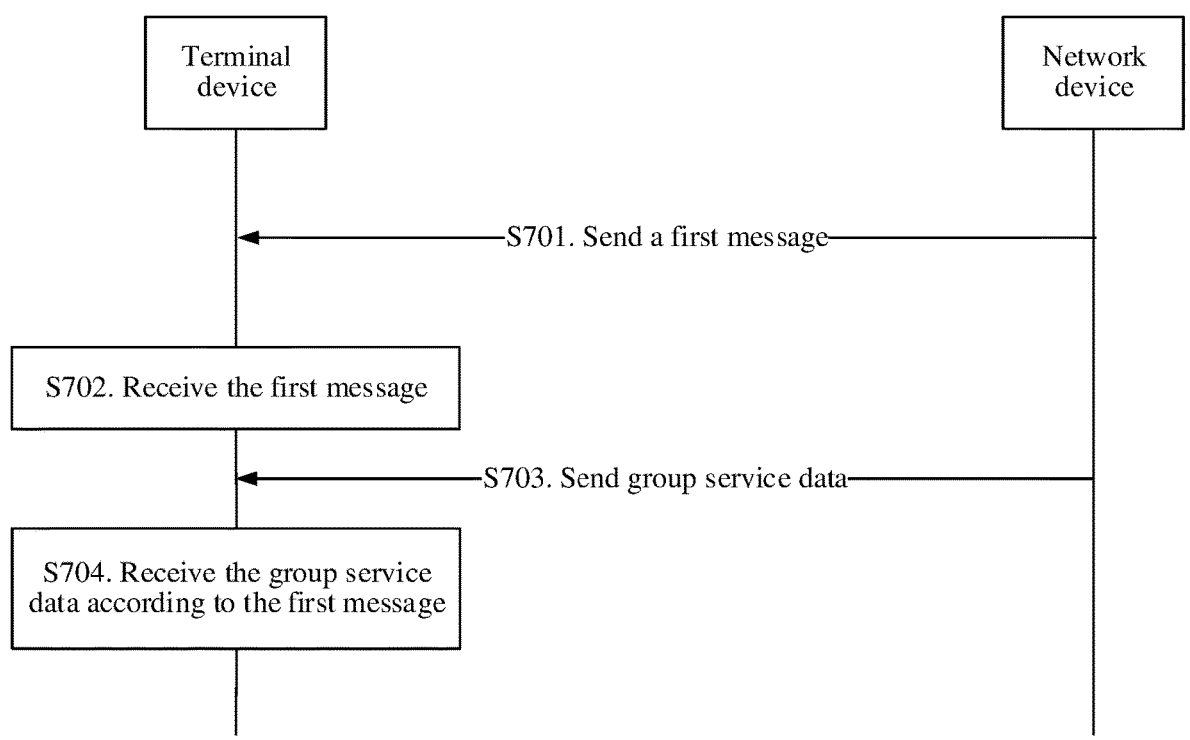
FIG. 7 is a schematic flowchart of a group communication method according to still another embodiment of the present disclosure.

FIG. 7 is a schematic flowchart of a group communication method according to still another embodiment of the present disclosure. As shown in FIG. 7, the method includes the following steps.

Step S701: A network device sends a first message.
Step S702: The terminal device receives the first message.
Step S703: The network device sends group service data.
Step S704: The terminal device receives the group service data according to the first message.

In step S701, the first message sent by the network device includes at least one group service identifier, and one group service identifier corresponds to one group service.

In step S703, the network device sends a group service corresponding to the at least one group service identifier to the terminal device.

In step S704, the terminal device receives, according to the first message, a first group service corresponding to a first group service identifier of the terminal device.

Optionally, in step S704, when the at least one group service identifier sent by the network device includes the first group service identifier of the terminal device, the terminal device is configured to receive the first group service according to the first message received by the terminal device.

Optionally, in step S701, the first message further includes at least one of a period for sending the first message by the network device, a change period of the first message, a time offset of each group service corresponding to the at least one group service identifier, a logical channel number of each group service, and a second RNTI.

Optionally, in step S704, receiving, by the terminal device according to the first message, a first group service corresponding to a first group service identifier of the terminal device includes receiving, by the terminal device, second downlink control information according to the second RNTI when the first message includes the second RNTI, or receiving, by the terminal device, second downlink control information according to a second default RNTI when the first message does not include the second RNTI.

Optionally, in step S704, receiving, by the terminal device according to the first message, a first group service corresponding to a first group service identifier of the terminal device includes receiving, by the terminal device, a MAC PDU according to the second downlink control information when the first message includes the logical channel number of each group service corresponding to the at least one group service identifier, and obtaining, by the terminal device, a MAC SDU of the first group service according to a logical channel number of the first group service in the logical channel number of each group service.

Optionally, in step S704, the MAC PDU carries a MAC CE to indicate that the first group service ends.

Optionally, the terminal device determines, according to change indication information, that the first message is changed. The change indication information includes indication information that indicates that the first message is changed and that is carried in a paging message, indication information that indicates that the first message is changed and that is carried in SIB1, or indication information that indicates that the first message is changed and that is carried in the first downlink control information, when the terminal device receives the first downlink control information.

Optionally, in an embodiment of the present disclosure, the network device sends, to the terminal device, indication information indicating that the first message is changed, including sending a paging message carrying the indication information to the terminal device, sending an SIB1 message carrying the indication information to the terminal device, or sending first downlink control information carrying the indication information to the terminal device.

Optionally, in an embodiment of the present disclosure, receiving, by a terminal device, a first message sent by a network device includes receiving the first message at a moment at which the network device sends multicast control information if the terminal device does not store the first message, and receiving a changed first message at a moment at which the network device sends the changed first message in order to receive a changed first group service according to the changed first message if the terminal device already stores the multicast control information and determines that the first message is changed.

Based on the foregoing technical solution, a terminal device receives a first message that is sent by a network device and that includes a group service identifier of each group service sent by the network device such that the terminal device can receive, according to the received first message, a group service sent by the network device. Therefore, implementations of the present disclosure provide a method for implementing group communication, a terminal device, and a network device. In this way, not only point-to-multipoint group communication in a single cell can be implemented, but also one group service can be sent using only one share of resources to all terminal devices that need to receive the group service, thereby reducing a waste of radio resources. In addition, receiving configuration of each group service can further be modified using a unified configuration message, thereby implementing dynamic, flexible, and efficient group service configuration and transmission.

Figure 8:
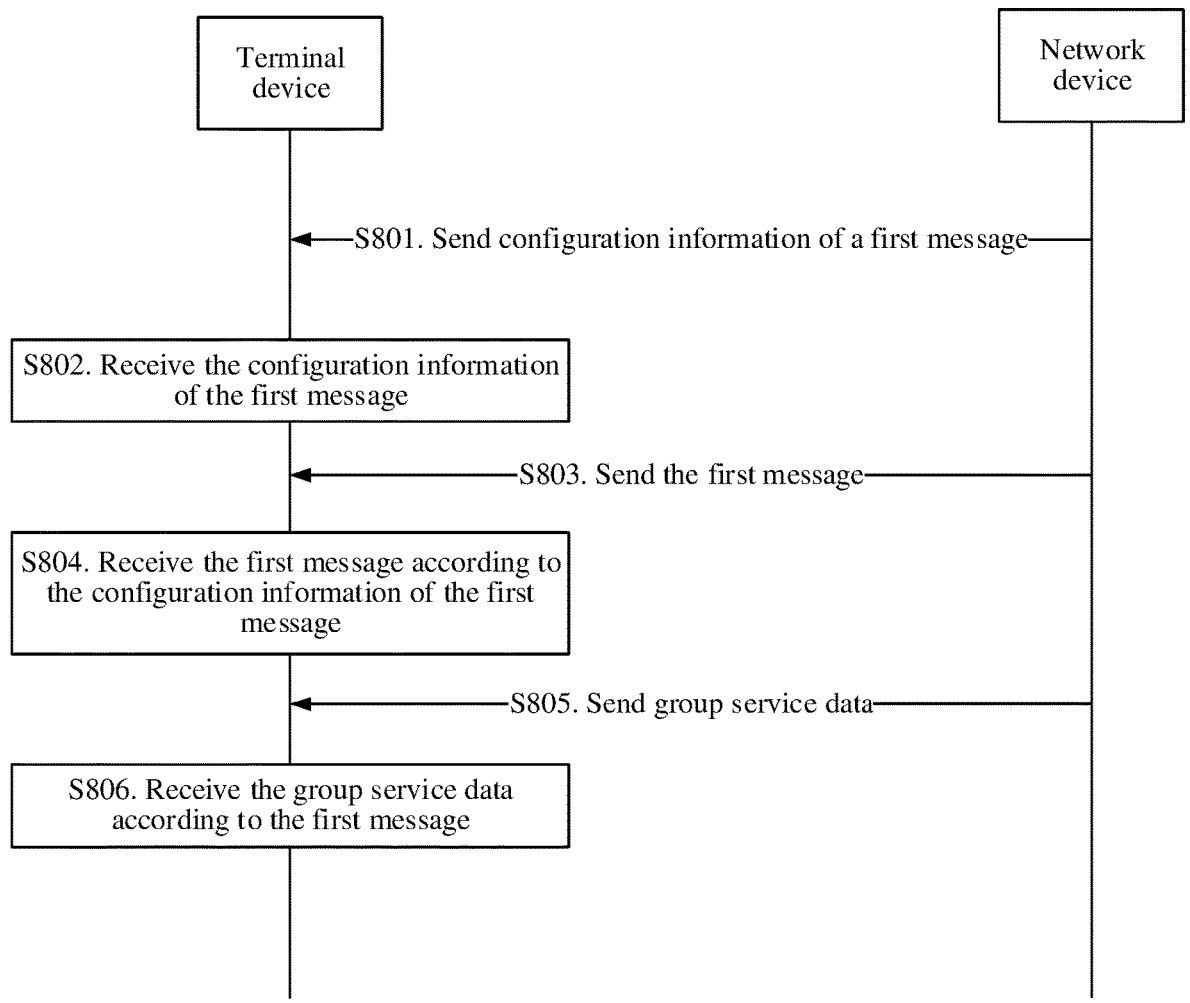
FIG. 8 is a schematic flowchart of a group communication method according to still another embodiment of the present disclosure.

FIG. 8 is a schematic flowchart of a group communication method according to still another embodiment of the present disclosure. As shown in FIG. 8, the method includes the following steps.

Step S801: A network device sends configuration information of a first message.

Step S802: A terminal device receives the configuration information of the first message.

Step S803: The network device sends the first message.

Step S804: The terminal device receives the first message according to the configuration information of the first message.

Step S805: The network device sends group service data.

Step S806: The terminal device receives the group service data according to the first message.

In step S801, the network device sends the configuration information of the first message to instruct the terminal device to receive the first message according to the configuration information of the first message. The configuration information of the first message includes at least one of a time pattern that is used by the network device to send the first message, a modulation and coding scheme of the first message, and a first RNTI.

Optionally, in step S801, the time pattern that is used by the network device to send the first message includes at least one of a change period of the first message, a repetition coefficient for sending the first message, and a time offset of the first message.

Optionally, in step S803, the first message sent by the network device further includes at least one of a period for sending the first message, a change period of the first message, a time offset of each group service corresponding to at least one group service identifier, a logical channel number of each group service, and a second RNTI.

Optionally, in step S804, receiving, by the terminal device, configuration information of the first message in order to receive the first message according to the configuration information of the first message includes receiving, by the terminal device, first downlink control information according to the first RNTI when the configuration information includes the first RNTI, or receiving, by the terminal device, first downlink control information according to a first default RNTI when the configuration information does not include the first RNTI.

In step S805, the network device sends a group service corresponding to the at least one group service identifier to the terminal device.

Optionally, in step S806, when the at least one group service identifier sent by the network device includes a first group service identifier of the terminal device, the terminal device is configured to receive a first group service according to the first message received by the terminal device.

Optionally, the first message sent by the network device further includes at least one of a period for sending the first message by the network device, a change period of the first message, a time offset of each group service corresponding to the at least one group service identifier, a logical channel number of each group service, and a second RNTI.

Optionally, in step S806, receiving, by the terminal device according to the first message, a first group service corresponding to a first group service identifier of the terminal device includes receiving, by the terminal device, second downlink control information according to the second RNTI when the first message includes the second RNTI, or receiving, by the terminal device, second downlink control information according to a second default RNTI when the first message does not include the second RNTI.

Optionally, in step S806, receiving, by the terminal device according to the first message, a first group service corresponding to a first group service identifier of the terminal device includes receiving, by the terminal device, a MAC PDU according to the second downlink control information when the first message includes the logical channel number of each group service corresponding to the at least one group service identifier, and obtaining, by the terminal device, a MAC SDU of the first group service according to a logical channel number of the first group service in the logical channel number of each group service.

Optionally, in step S806, the MAC PDU carries a MAC CE to indicate that the first group service ends.

Optionally, the terminal device determines, according to change indication information, that the first message is changed. The change indication information includes indication information that indicates that the first message is changed and that is carried in a paging message, indication information that indicates that the first message is changed and that is carried in SIB1, or indication information that indicates that the first message is changed and that is carried in the first downlink control information, when the terminal device receives the first downlink control information.

Optionally, in an embodiment of the present disclosure, the network device sends to the terminal device, indication information indicating that the first message is changed, including sending a paging message carrying the indication information to the terminal device, sending an SIB1 message carrying the indication information to the terminal device, or sending first downlink control information carrying the indication information to the terminal device.

Optionally, in an embodiment of the present disclosure, receiving, by a terminal device, a first message sent by a network device includes receiving the first message at a moment at which the network device sends multicast control information if the terminal device does not store the first message, and receiving a changed first message at a moment at which the network device sends the changed first message in order to receive a changed first group service according to the changed first message if the terminal device already stores the multicast control information and determines that the first message is changed.

Based on the foregoing technical solution, a terminal device receives a first message that is sent by a network device and that includes a group service identifier of each group service sent by the network device such that the terminal device can receive, according to the received first message, a group service sent by the network device. Therefore, implementations of the present disclosure provide a method for implementing group communication, a terminal device, and a network device. In this way, not only point-to-multipoint group communication in a single cell can be implemented, but also one group service can be sent using only one share of resources to all terminal devices that need to receive the group service, thereby reducing a waste of radio resources. In addition, receiving configuration of each group service can further be modified using a unified configuration message, thereby implementing dynamic, flexible, and efficient group service configuration and transmission.

Figure 9:
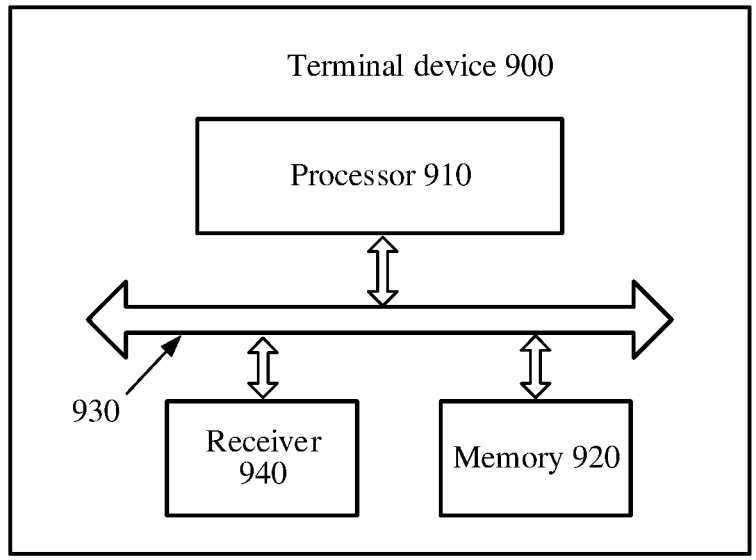
FIG. 9 is a schematic block diagram of a terminal device according to another embodiment of the present disclosure.

FIG. 9 is a schematic block diagram of a terminal device 900 according to another embodiment of the present disclosure. As shown in FIG. 900, the terminal device 900 includes a processor 910, a memory 920, a bus system 930, and a receiver 940. The processor 910, the memory 920, and the receiver 940 are connected by the bus system 930. The memory 920 is configured to store an instruction. The processor 910 is configured to execute the instruction stored in the memory 920, and control the receiver 940 to receive information. The receiver 940 may be configured to receive a first message sent by a network device. The first message includes at least one group service identifier, and one group service identifier corresponds to one group service. The receiver 940 is further configured to receive, according to the first message, a first group service corresponding to a first group service identifier of the terminal device 900.

Optionally, in an embodiment of the present disclosure, the receiver 940 is configured to receive configuration information of the first message in order to receive the first message according to the configuration information of the first message. The configuration information of the first message includes at least one of a time pattern that is used by the network device to send the first message, a modulation and coding scheme of the first message, and a first RNTI.

Optionally, in an embodiment of the present disclosure, the time pattern, received by the receiver 940, for receiving the first message includes at least one of a change period of the first message, a repetition coefficient for sending the first message, and a time offset of the first message.

Optionally, in an embodiment of the present disclosure, the receiver 940 is further configured to receive first downlink control information according to the first RNTI when the configuration information includes the first RNTI, or receive first downlink control information according to a first default RNTI when the configuration information does not include the first RNTI.

Optionally, in an embodiment of the present disclosure, the receiver 940 is further configured to receive the first group service according to the first message when the at least one group service identifier includes the first group service identifier of the terminal device 900.

Optionally, in an embodiment of the present disclosure, the first message received by the receiver 940 further includes at least one of a period for sending the first message by the network device, a change period of the first message, a time offset of each group service corresponding to the at least one group service identifier, a logical channel number of each group service, and a second RNTI.

Optionally, in an embodiment of the present disclosure, the receiver 940 is further configured to receive second downlink control information according to the second RNTI when the first message includes the second RNTI, or receive downlink control information of each group service according to a second default RNTI when the first message does not include the second RNTI.

Optionally, in an embodiment of the present disclosure, the receiver 940 is further configured to receive second downlink control information according to the second RNTI in order to receive the first group service according to the second downlink control information when the first message includes the second RNTI, or receive second downlink control information according to a second default RNTI in order to receive the first group service according to the second downlink control information when the first message does not include the second RNTI.

Optionally, in an embodiment of the present disclosure, the receiver 940 is further configured to receive a MAC PDU according to the second downlink control information, and receive, according to a logical channel number of the first group service in the logical channel number of each group service, a MAC SDU of the first group service when the first message includes the logical channel number of each group service, the terminal device, or receive, according to the first group service identifier, a MAC SDU of the first group service when the first message does not include the logical channel number of each group service.

Optionally, in an embodiment of the present disclosure, the processor 910 is configured to determine, according to change indication information, that the first message is changed. The change indication information includes indication information that indicates that the first message is changed and that is carried in a paging message, indication information that indicates that the first message is changed and that is carried in an SIB1 message, or indication information that indicates that the first message is changed and that is carried in the first downlink control information, when the terminal device receives the first downlink control information.

Optionally, in an embodiment of the present disclosure, the receiver 940 is further configured to receive the first message at a moment at which the network device sends multicast control information if the terminal device 900 does not store the first message, and receive a changed first message at a moment at which the network device sends the changed first message in order to receive a changed first group service according to the changed first message if the terminal device 900 already stores the multicast control information and determines that the first message is changed.

Based on the foregoing technical solution, the terminal device 900 receives a first message that is sent by a network device and that includes a group service identifier of each group service sent by the network device such that the terminal device 900 can receive, according to the received first message, a group service sent by the network device. Therefore, implementations of the present disclosure provide a method for implementing group communication, a terminal device, and a network device. In this way, not only point-to-multipoint group communication in a single cell can be implemented, but also one group service can be sent using only one share of resources to all terminal devices that need to receive the group service, thereby reducing a waste of radio resources. In addition, receiving configuration of each group service can further be modified using a unified configuration message, thereby implementing dynamic, flexible, and efficient group service configuration and transmission.

Figure 10:
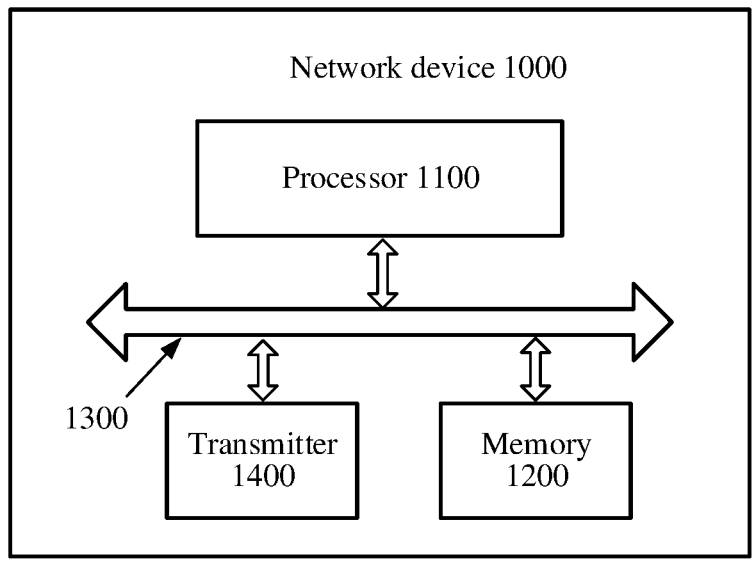
FIG. 10 is a schematic block diagram of a network device according to another embodiment of the present disclosure.

FIG. 10 is a schematic block diagram of a network device 1000 according to another embodiment of the present disclosure. As shown in FIG. 1000, the network device 1000 includes a processor 1100, a memory 1200, a bus system 1300, and a transmitter 1400. The processor 1100, the memory 1200, and the transmitter 1400 are connected by the bus 1300. The memory 1200 is configured to store an instruction. The processor 1100 is configured to execute the instruction stored in the memory 1200, and control the transmitter 1400 to send information. The transmitter 1400 may be configured to send a first message to a terminal device. The first message includes at least one group service identifier, and one group service identifier corresponds to one group service. The transmitter 1400 is further configured to send a group service corresponding to the at least one group service identifier to the terminal device.

Optionally, in an embodiment of the present disclosure, the transmitter 1400 is configured to send configuration information of the first message such that the terminal device receives the first message according to the configuration information of the first message. The configuration information of the first message includes at least one of a time pattern for sending the first message, a first RNTI manner, and a modulation and coding scheme of the first message.

Optionally, in an embodiment of the present disclosure, the time pattern used by the transmitter 1400 to send the first message includes at least one of a change period of the first message, a repetition coefficient of the first message, and a time offset of the first message.

Optionally, in an embodiment of the present disclosure, the first message sent by the transmitter 1400 further includes at least one of a period for sending the first message, a change period of the first message, a time offset of each group service corresponding to the at least one group service identifier, a second RNTI, and a logical channel number of each group service.

Optionally, in an embodiment of the present disclosure, the transmitter 1400 is configured to send indication information indicating that the first message is changed to the terminal device, including sending a paging message carrying the indication information to the terminal device, sending an SIB1 message carrying the indication information to the terminal device, or sending first downlink control information carrying the indication information to the terminal device.

Based on the foregoing technical solution, a terminal device receives a first message that is sent by the network device 1000 and that includes a group service identifier of each group service sent by the network device 1000 such that the terminal device can receive, according to the received first message, a group service sent by the network device 1000. Therefore, implementations of the present disclosure provide a method for implementing group communication, a terminal device, and a network device. In this way, not only point-to-multipoint group communication in a single cell can be implemented, but also one group service can be sent using only one share of resources to all terminal devices that need to receive the group service, thereby reducing a waste of radio resources. In addition, receiving configuration of each group service can further be modified using a unified configuration message, thereby implementing dynamic, flexible, and efficient group service configuration and transmission.

It should be noted that in all of the foregoing embodiments of the present disclosure, the processing module may be implemented by at least one processor. The processor may be a central processing unit (CPU), or may be another general-purpose processor, digital signal processor (DSP), application-specific integrated circuit (ASIC), field-programmable gate array (FPGA), or another programmable logic device, independent gate or transistor logic device, independent hardware component, or the like. The sending module may be implemented by a transmitter, or may be implemented by a transceiver. In addition, in the foregoing embodiments of the present disclosure, the network device and the UE/terminal device may further include parts such as a receiver and a memory. The memory may include a read-only memory (ROM) and a random access memory (RAM), and provide instructions and data to the processor. A part of the memory may further include a non-volatile RAM. For example, the memory may further store device type information. The processor invokes instruction code of the memory to control other modules of the network device and the UE/terminal device in the embodiments of the present disclosure to perform the foregoing operations.

It should be understood that "an embodiment" or "an embodiment" mentioned in the whole specification does not mean that particular features, structures, or characteristics related to the embodiment are included in at least one embodiment of the present disclosure. Therefore, "in an embodiment" or "in an embodiment" appearing throughout the specification does not refer to a same embodiment. In addition, these particular features, structures, or characteristics may be combined in one or more embodiments using any appropriate manner.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases, where only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining A according to B does not mean that B is determined according to A only, that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
   receiving first downlink control information based on a first default radio network temporary identifier (RNTI);
   receiving a first message from a network device based on the first downlink control information, wherein the first message comprises at least one group service identifier, and wherein each of the at least one group service identifier corresponds to one group service; and
   receiving, based on the first message, a first group service corresponding to a first group service identifier of a terminal device, wherein the first group service identifier belongs to the at least one group service identifier.

2. The method of claim 1, further comprising receiving the first message based on configuration information of the first message, wherein the configuration information of the first message comprises at least one of:
   a time pattern used by the network device to send the first message;
   a modulation and coding scheme of the first message; or
   a time pattern used by the network device to send the first message and a modulation and coding scheme of the first message.

3. The method of claim 2, wherein the time pattern comprises at least one of a change period of the first message, a repetition coefficient for sending the first message, or a time offset of the first message.

4. The method of claim 1, further comprising:
   receiving, when the first message comprises a second RNTI, second downlink control information based on the second RNTI in order to receive the first group service based on the second downlink control information; or
   receiving, when the first message does not comprise a second RNTI, the second downlink control information based on a second default RNTI to receive the first group service based on the second downlink control information.

5. The method of claim 1, further comprising determining, based on change indication information, that the first message is changed, wherein the change indication information comprises indication information indicating that the first message is changed, and wherein the indication information is carried in a paging message.

6. The method of claim 1, further comprising determining, based on change indication information, that the first message is changed, wherein the change indication information comprises indication information indicating that the first message is changed, and wherein the indication information is carried in a system information block 1 (SIB1) message.

7. The method of claim 1, further comprising determining, based on change indication information, that the first message is changed, wherein the change indication information comprises indication information indicating that the first message is changed, and wherein the indication information is carried in downlink control information.

8. A communications system, comprising:
   a terminal device; and
   a network device communicatively coupled to the terminal device, wherein the network device is configured to:
      send, to the terminal device, first downlink control information based on a first default radio network temporary identifier (RNTI), wherein the first downlink control information instructs the terminal device to receive a first message;
      send the first message to the terminal device, wherein the first message comprises at least one group service identifier, and wherein each of the at least one group service identifier corresponds to one group service; and
      send at least one group service corresponding to the at least one group service identifier to the terminal device; and
   wherein the terminal device is configured to:
      receive the first downlink control information based on the first default RNTI;
      receive the first message under instruction of the first downlink control information; and
      receive, based on the first message, a first group service corresponding to a first group service identifier of the terminal device, wherein the first group service identifier belongs to the at least one group service identifier.

9. The communications system of claim 8, wherein the network device is further configured to send configuration information of the first message to the terminal device, wherein the configuration information of the first message comprises at least one of:
   a time pattern to send the first message;
   a modulation and coding scheme of the first message; or
   a time pattern to send the first message and a modulation and coding scheme of the first message, and wherein the terminal device is configured to receive the configuration information.

10. The communications system of claim 9, wherein the first message further comprises at least one of a period for sending the first message, a change period of the first message, a time offset of each group service in the at least one group service identifier, a second RNTI, or a logical channel number of each group service.

11. The communications system of claim 8, wherein the at least one group service identifier comprises the first group service identifier of the terminal device, and wherein the network device is further configured to send the first group service based on the first message to the terminal device.

12. The communications system of claim 8, either wherein when the first message comprises a second RNTI, the network device is further configured to send second downlink control information based on the second RNTI to the terminal device, and the terminal device is configured to receive the first group service based on the second downlink control information under instruction of the second RNTI, or
wherein when the first message does not comprise a second RNTI, the network device is further configured to send the second downlink control information based on a second default RNTI to the terminal device, and wherein the terminal device is configured to receive the first group service based on the second downlink control information under instruction of the second default RNTI.

13. An apparatus comprising:
at least one processor; and
a memory for storing a program comprising instructions that, when executed by the at least one processor, cause a terminal device to:
receive first downlink control information based on a first default radio network temporary identifier (RNTI);
receive a first message from a network device under instruction of the first downlink control information, wherein the first message comprises at least one group service identifier, and wherein each of the at least one group service identifier corresponds to one group service; and
receive, based on the first message, a first group service corresponding to a first group service identifier of the terminal device, wherein the first group service identifier belongs to the at least one group service identifier.

14. The apparatus of claim 13, wherein the program comprises further instructions that, when executed by the at least one processor, cause the terminal device to receive configuration information of the first message to instruct to receive the first message based on the configuration information of the first message, and wherein the configuration information of the first message comprises at least one of:
a time pattern used by the network device to send the first message;
a modulation and coding scheme of the first message; or
a time pattern used by the network device to send the first message and a modulation and coding scheme of the first message.

15. The apparatus of claim 14, wherein the time pattern comprises at least one of a change period of the first message, a repetition coefficient for sending the first message, or a time offset of the first message.

16. The apparatus of claim 13, wherein when the first message comprises a second RNTI, the program comprises further instructions executed by the at least one processor to cause the terminal device to receive second downlink control information based on the second RNTI in order to receive the first group service based on the second downlink control information.

17. The apparatus of claim 13, wherein the program comprises further instructions that, when executed by the at least one processor, cause the terminal device to determine, based on change indication information, that the first message is changed, wherein the change indication information comprises indication information indicating that the first message is changed, and wherein the indication information is carried in a paging message.

18. The apparatus of claim 13, wherein the program comprises further instructions that, when executed by the at least one processor, cause the terminal device to determine, based on change indication information, that the first message is changed, wherein the change indication information comprises indication information indicating that the first message is changed, and wherein the indication information is carried in a system information block 1 (SIB1) message.

19. The apparatus of claim 13, wherein the program comprises further instructions that, when executed by the at least one processor, cause the terminal device to determine, based on change indication information, that the first message is changed, wherein the change indication information comprises indication information indicating that the first message is changed, and wherein the indication information is carried in downlink control information.

20. The apparatus of claim 13, wherein when the first message does not comprise a second RNTI, the program comprises further instructions that, when executed by the at least one processor, cause the terminal device to receive second downlink control information based on a second default RNTI to receive the first group service based on the second downlink control information.

* * * * *